United States Patent
Retsch et al.

(10) Patent No.: US 6,835,458 B2
(45) Date of Patent: Dec. 28, 2004

(54) COATING COMPOSITION HAVING IMPROVED MAR AND SCRATCH PROPERTIES

(75) Inventors: William H. Retsch, Castle Shannon, PA (US); John R. Schneider, Glenshaw, PA (US); Daniela White, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 10/414,975

(22) Filed: Apr. 16, 2003

(65) Prior Publication Data

US 2004/0209088 A1 Oct. 21, 2004

(51) Int. Cl.⁷ .............................. B32B 9/04; C08K 5/54
(52) U.S. Cl. ...................... 428/447; 524/266; 524/268; 524/430; 524/431; 524/437; 524/588; 525/100; 525/446; 525/474
(58) Field of Search .......................... 428/447; 524/266, 524/268, 430, 437, 588, 265, 267; 525/100, 446, 474, 477

(56) References Cited

U.S. PATENT DOCUMENTS

2003/0185771 A1 * 10/2003 Kamei et al. .................. 424/59

FOREIGN PATENT DOCUMENTS

JP          2001049094 A  *  2/2001  ........... C08L/67/02

* cited by examiner

Primary Examiner—Margaret G. Moore
Assistant Examiner—Marc S Zimmer
(74) Attorney, Agent, or Firm—Jacques B. Miles; William J. Uhl

(57) ABSTRACT

An additive for a coating composition is disclosed. The additive comprises particles dispersed in a siloxane compound. When the additive is incorporated into a coating composition, the coating composition demonstrates improved mar and scratch performance. The particles can be reacted with a compound comprising a surface-active moiety prior to dispersion in the siloxane.

28 Claims, No Drawings

COATING COMPOSITION HAVING IMPROVED MAR AND SCRATCH PROPERTIES

FIELD OF THE INVENTION

The present invention relates to novel additives for coating compositions that provide improved mar and/or scratch resistance to cured coating compositions.

BACKGROUND

Coating systems can have many variations including "color-plus-clear" coating systems and "monocoat" coating systems. Color-plus-clear coating systems involve the application of a colored or pigmented basecoat to a substrate followed by the application of a transparent clearcoat over the basecoat. Such coating systems have become increasingly popular as original finishes for a number of consumer products including, for example, cars and floor coverings such as wood flooring. The color-plus-clear coating systems have outstanding appearance properties such as gloss and distinctness of image due in large part to the clearcoat.

Monocoat coating systems involve the application of a single layer of colored coating to a substrate as the topcoat. Monocoat coating systems are frequently used for household appliances, lawn and garden equipment, interior fixtures, and the like.

Both color-plus-clear systems and monocoat coating systems can utilize powder coatings. In recent years, powder coatings have become increasingly popular because these coatings are inherently low in volatile organic content (VOC). The low VOC significantly reduces air emissions during application and curing as compared to liquid coatings. Liquid coatings are still used in many systems, however, particularly those wherein solvent emissions are permitted. For example, the coating of elastomeric automotive parts is often done by spraying liquid compositions.

Topcoat film-forming compositions, such as the protective and/or decorative one coats for household appliances and the transparent clearcoat in color-plus-clear coating systems for automotive applications, are subject to defects that occur during the assembly process and damage from both the environment and normal use of the end product. Paint defects that occur during assembly include the paint layer being too thick or too thin, "fish eyes" or craters, and under-cured or over-cured paint. These defects can affect the color, brittleness, solvent resistance and mar and scratch performance of the coating. Damaging environmental factors include acidic precipitation, exposure to ultraviolet radiation from sunlight, high relative humidity and high temperatures; these factors can also result in compromised performance. Normal use of consumer products will often lead to marring, scratching and/or chipping of the surface due to contact with hard objects, contact with brushes and/or abrasive cleansers during normal cleaning processes, and the like.

Thus, there is a need in the coatings art for topcoats having good scratch and mar resistance.

SUMMARY OF THE INVENTION

The present invention is directed to an additive for use in coating compositions, including both liquid and powder coating compositions. The additive generally comprises particles dispersed in at least one siloxane compound. Coating compositions comprising the additive and methods for using the same are also within the scope of the invention, as are articles coated according to these methods.

Historically, the incorporation of particles into coatings, especially powder coatings, has been very hard to achieve. It has now been surprisingly discovered that particles can be introduced into a coating composition using a siloxane compound; the siloxane compound acts as a carrier to introduce the particles into the coating composition. Coatings comprising the present additive have enhanced mar and/or scratch resistance as compared with the same coatings lacking the additive. According to the present invention, coatings can be formulated with improved mar and/or scratch characteristics without significantly affecting the appearance or other mechanical properties of the coatings.

"Mar" and "scratch" refer herein to physical deformations resulting from mechanical or chemical abrasion. "Mar resistance" is a measure of a material's ability to resist appearance degradation caused by small scale mechanical stress. "Scratch resistance" is the ability of a material to resist more severe damage that can lead to visible, deeper or wider trenches. Thus, scratches are generally regarded as being more severe than what is referred to in the art as mar, and the two are regarded in the art as being different. As noted above, marring and scratching can result from manufacturing and environmental factors as well as through normal use. Although mar and scratch are in many respects differing degrees of the same thing, a coating that improves mar resistance may not be effective in improving scratch resistance, and vice versa. It will be appreciated, therefore, that the present additive can be used in conjunction with other additives that impart improved mar and/or scratch resistance to coatings. For example, one additive that offers particularly good mar resistance can be coupled with one that offers particularly good scratch resistance.

DESCRIPTION OF THE INVENTION

Other than in the operating examples, or where otherwise indicated, all numbers expressing quantities of ingredients, reaction conditions and so forth used in the specification and claims are to be understood as being modified in all instances by the term "about." Also, it should be understood that any numerical range recited herein is intended to include all sub-ranges subsumed therein. For example, a range of "1 to 10" is intended to include all sub-ranges between and including the recited minimum value of 1 and the recited maximum value of 10, that is, having a minimum value equal to or greater than 1 and a maximum value of equal to or less than 10.

As used herein, the term "polymer" refers to oligomers and both homopolymers and copolymers and the prefix "poly" refers to two or more.

The present invention is generally directed to an additive comprising at least one siloxane compound and particles. The particles are dispersed in the siloxane compound. The siloxane compound of the present invention can be any siloxane compound having functionality capable of donating a proton in a hydrogen bonding fashion (i.e., a "hydrogen active group"). Suitable siloxane compounds can be represented by the structure (I) below

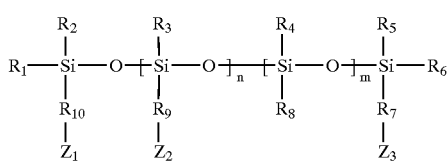

wherein $R_1$, $R_2$, $R_3$, $R_4$, $R_5$, $R_6$, and $R_8$, which can be the same or different, are monovalent hydrocarbon groups of 1 to 10 carbon atoms; $R_7$, $R_9$, and $R_{10}$, which can be the same or different, are divalent hydrocarbon groups of 1 to 24 carbon atoms; and at least one of the Z groups- $Z_1$, $Z_2$, or $Z_3$- contains a hydrogen active group, as noted above, a hydrogen active group is one that can undergo hydrogen bonding. The other Z groups of structure I can be the same or different and can contain groups that are not capable of hydrogen bonding. Examples of hydrogen active groups include OH, COOH, $NH_2$, $NHR_{11}$, $CONH_2$, $CONHR_{11}$, and $NHCOOR_{11}$ where $R_{11}$ is a monovalent hydrocarbon group. "n" and "m" indicate the number of repeating units and can be 0 to 12.

By "monovalent hydrocarbon group" is meant an organic group containing carbon and hydrogen. The hydrocarbon groups may be aliphatic, aromatic, cyclic or acyclic and may contain from 1 to 24 (in the case of aromatic from 3 to 24) carbon atoms. Optionally, the monovalent hydrocarbon groups can comprise heteroatomic hydrocarbon groups, that is, the carbon molecules can be substituted with heteroatoms, typically oxygen or nitrogen. Non-limiting examples of monovalent hydrocarbon groups include alkyl, alkoxyl, aryl, alkylaryl or alkoxyaryl groups.

By "divalent hydrocarbon group" is meant an organic group containing carbon and hydrogen. A "divalent hydrocarbon group" can also comprise heteroatomic hydrocarbon groups, that is, one or more of the carbon molecules in the groups can be substituted with heteroatoms, typically oxygen or nitrogen in the form of, for example, ethers, esters, and amides. Nonlimiting examples of divalent hydrocarbon groups include alkyl, alkoxyl, aryl, alkylaryl, alkoxyalkyl or alkoxyaryl groups.

By "alkyl" is meant acyclic or cyclic groups having a carbon chain length of from $C_1$ to $C_{25}$. By "alkoxyl" is meant an alkyl group containing at least one oxygen atom, such as an ether oxygen, and having a carbon chain length of from $C_2$ to $C_{25}$, such as from $C_2$ to $C_8$; this includes compounds having one or more ester linkages. An "aryl" group is an aromatic group containing one or more aromatic rings, fused or unfused, containing 3 to 24 carbons. By "alkylaryl" is meant an acyclic alkyl group having a carbon chain length from $C_2$ to $C_{25}$ and containing at least one aryl group, such as phenyl. Similarly, "alkoxyaryl" refers to an alkyl group containing at least one oxygen atom and having a carbon chain length from $C_2$ to $C_{25}$, and at least one aryl group. The aryl group(s), either alone or in conjunction with an alkyl or alkoxy group, may optionally be substituted. Suitable substituents include heteroatoms (O, N and S), hydroxyl, benzyl, carboxylic acid, alkoxy and alkyl groups, for example.

In one particular embodiment of the present invention, n is 1 and m is 0 to 3, at least one of $R_1$-$_6$ are methyl, $R_9$ is a divalent hydrocarbon group containing an ether and an ester, $Z_2$ is a carboxylic acid, $R_7$ and $R_{10}$ are methylenes, and $Z_1$ and $Z_3$ are hydrogen.

Examples of suitable siloxane compounds include 1,1,1, 3,3,5,5 heptamethyl-5-(hydroxyethoxypropyl)trisiloxane, 1,1 ,3, 3-tetramethyl-1,3-di(hydroxyethoxypropyl) trisiloxane, and [3-[1,3,3,3-tetramethyl-1-[(trimethylsilyl) oxy]disiloxanyl]propoxyl]-propanol. Another suitable siloxane is the reaction product of a silicone surfactant like MASIL SF-19, which is commercially available from BASF, and hexahydrophthalic anhydride.

The amount of siloxane compound in the additive can be from 30 to 98 weight percent or from 40 to 80 weight percent or from 50 to 70 weight percent, based on the total weight of the additive.

As noted above, the present additive comprises particles dispersed in the siloxane compound. Suitable particles include organic particles, inorganic particles, and combinations thereof. Examples of suitable particles include, but are not limited, to silica; various forms of alumina; alumina silicate; silica alumina; alkali aluminosilicate; borosilicate glass; oxides including titanium dioxide and zinc oxide; quartz; and zircon such as in the form of zirconium oxide. Boron nitride, silicon nitride, nepheline syenite, buddeluyite, and eudialyte can also be used as can mixtures of any of these particles.

The silica can be in any form such as crystalline, amorphous, fused, or precipitated. For example, a silica particle having one or more surface silanol groups such as a silica particle having between about 0.5 and 4.0 mmol surface OH/g of particle can be used.

Silica in its various forms is commercially available from numerous sources. For example, silica is commercially available from Nissan as MT-ST, MEK-ST, and MIBK-ST and from Clariant as HIGHLINK OG. The MEK-ST and MIBK-ST products are 30 percent silica dispersions, in which the surface of the silica particles has been modified to render the particles stable in a non-hydroxy solvent. Crystalline silica is commercially available from Reade Advanced Materials; amorphous and precipitated silica are commercially available from PPG Industries, Inc.; silica alumina ceramic alloy particles are commercially available as ZEEOSPHERES from 3M Corporation; colloidal silica is commercially available from Nissan Chemicals; silica alumina, such as G200, G-400, G-600, is commercially available from 3M Corporation; alkali alumina silicate, such as W-210, W410, and W610, is commercially available from 3M Corporation; and borosilicate glass is commercially available as SUNSPHERES from MoSci Corporation.

Alumina in any of its forms, such as alpha, beta, gamma, delta, theta, tabular alumina, and the like can be used as the particle. Fused or calcined alumina, including ground or unground calcined alumina, can be used. Suitable alumina products are commercially available from Micro Abrasives Corporation as WCA3, WCA3S, and WCA3TO, and from Alcoa as TE4–20.

Zircon, buddeluyite, eudialyte, and boron nitride can also be used as the particles in the present invention. Boron nitride is commercially available from Carborundum Inc. as SHP-605 and HPP-325.

Optionally, the particles used in the present invention can be modified by reacting them with a compound having a "surface-active" moiety before being dispersed in the siloxane compound to form the additive of the present invention. "Surface active" as used herein refers to any compound or moiety that, when attached to the particles used herein, lowers the solid surface tension or surface energy of the particle. When the particles are modified in this manner before being dispersed in the siloxane compound, the particles are even less likely to agglomerate. In addition, modified particles may be more surface-active and impart greater mar and/or scratch resistance.

For modification to be affected, the particles need an active site or functional group. The surface-active moiety must be able to chemically attach to the surface of the particles by reacting with one or more of these active sites or functional groups. Particles that do not have an active site can be given one by reacting the particles with water. In the reaction with water, the Si—O—Si bonds on the particle surface break and form two Si—H groups. Examples of particles that do not have an active site include nitrides, buddeluyite, eudialyte, and calcined particles like calcined alumina.

Commercially available particles that are sold with surface treatments can be modified in the manner described. For example, particles such as MIBK-ST, which is a colloidal silica in MIBK solvent, and MEK-ST, a colloidal silica in MEK solvent, both of which are commercially available from Nissan, can be modified even though they contain a surface treatment applied by the supplier. The described modification serves to lower the surface tension of the commercially available particles to levels that make them suitable for use in the present invention.

Suitable compounds having a surface-active moiety can have the general structure (II):

F—L—Z        (II)

wherein F is a moiety containing one or more functional groups that will react with the particle surface, Z is a surface active moiety that decreases the surface tension of the particle, and L is a group that links F and Z.

Surface activity can be measured by contact angle measurements or by measuring surface tension (surface tension is inversely proportional to surface activity). The surface tension of an unmodified particle can be compared to the surface tension of the same particle but having a modifying group as described herein. If the modified particle has a lower surface tension than its unmodified counterpart, it can be concluded that the moiety attached to the particle decreased the surface tension of the particle and is therefore within the scope of the invention. All of the surface tension measurements relevant to the present invention can be done by any means known in the art such as the Owens-Wendt method using a Rame-Hart Contact Angle Goniometer, the use of which will be familiar to those skilled in the art.

Examples of compounds within general structure (II) that can be reacted with the present particles to render them more surface active can be represented by structure(III):

$Si(OR_{12})_3$—$(CH_2)_{n1}$—Z        (III)

wherein $R_{12}$ is an alkyl moiety having 1 to 30 carbons, such as 1 or 2 carbons, Z is, as described above, a moiety that decreases the surface tension of the particle to which it is attached and n1 is 0 to 5. In comparing structure (II) to structure (III), F would be represented by $Si(OR_{12})_3$, L would be represented by $(CH_2)_{n1}$ and Z would, of course, be Z.

When compounds having structure (III) are prepared using hydrosilylation techniques such as those described herein, "n1" will generally be 2 or 3. It will be appreciated that at least one of the alkoxy groups attached to the Si molecule is replaced by a functional group on the surface of the particle. In the case of silica particles, the alkoxy group is replaced by a silanol group on the particle surface.

The Z moiety can have no functional groups, or it can have one or more functional groups. In one embodiment, two or more functional groups are present on the Z moiety. The functional groups, if present, can be selected, for example, based on their ability to react with the crosslinker used in the resin formation. This can provide retained mar and/or scratch resistance because the particle will covalently bond with the resin/crosslinker at the surface of the coating. For certain applications, such reaction may be undesirable and the Z moiety does not contain any functional or reactive group.

Any Z moiety can be used according to the present invention, and will generally fall into one of three categories: a long chain alkyl group; a fluorocarbon-containing material; and a silane to which is attached at least two methyl groups. "Long chain" as used in this context refers to four or more carbon atoms, and a fluorocarbon-containing material refers to a material comprising at least one $CF_3$ group. The long chain alkyl group can be linear or branched. The Z moiety can be introduced to the particle in any manner known in the art. For example, the Z moiety may be part of a compound that, by itself, reacts with the particle, (i.e. contains an F moiety) such as a compound that contains a trialkoxy silane.

Alternatively, a compound containing a Z moiety can be reacted with another compound that contains an F moiety. This can be done by any means known in the art, by selecting the appropriate L moiety to bring together the F and Z moieties. For example, a trialkoxy silane wherein the fourth substituent has a first functional group can be reacted with a compound containing both a "Z" moiety and a second functional group; the first and second functional groups are selected so as to be reactive with each other. Upon reaction, the F and Z moieties are linked. Any pair of functional groups can be used. For example, if one functional group is an epoxy, the other can be an amine, a carboxylic acid or a hydroxy; if one functional group is an amine, the other can be an epoxy, isocyanate or carboxylic acid; if one functional group is an isocyanate, the other can be an amine or hydroxy; and if one functional group is an acrylate, the other can be an amine. Specific examples include the reaction of glycidyloxytrimethoxy propylsilane ("A-187") with a (di) alkylamine or A-187 with stearoyl sarcosine.

Examples of compounds having long alkyl chains are those within structure (III), wherein Z is —$(CH_2)_{n2}$—$CH_3$, and n2 is 1 to 30, such as 7 to 17. In this embodiment, the total of n1 and n2 is three or greater. Specific examples include octyltrimethoxy silane, octyltriethoxy silane, and octadecyltriethoxy silane. In another particular embodiment within structure (III) that introduces a long alkyl chain, Z is

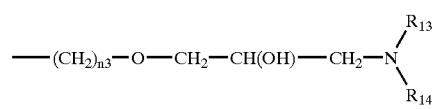

n3 is 1 to 3 and $R_{13}$ and $R_{14}$ are the same or different and $R_{13}$ can be hydrogen or an alkyl group having 1 to 30 carbons and $R_{14}$ is an alkyl group having 4 to 30 carbons. For example, $R_{13}$ can be H and $R_{14}$ can be $C_6H_{13}$, $C_8H_{17}$ or $C_{12}H_{25}$, or both $R_{13}$ and $R_{14}$ can be $(C_4H_9)$. It will be appreciated that this embodiment also introduces functional groups into the "F—L—Z—" compound.

Examples of compounds having fluorocarbon-containing moieties include but are not limited to those having structure (III) above, wherein n1 is 1 or 2, Z is —$(CF_2)_{m1}$—$CF_3$ and m1 is 0 to 30, such as 7. Perfluoro alkyl trialkoxy silanes fall within this category, such as perfluorooctyl triethoxy silane, fluoropropyltrimethoxy silane, and perfluorodecyl triethoxy silane.

Examples of compounds having dimethylsilane moieties include those of structure (III), wherein n1 is zero, Z is —$(CH_2)_{n4}$—$(Si(CH_3)_2)$—$O)_{m2}$—$Si (CH_3)_3$, n4 is 0 to 17, such as 2, and m2 is between 1 and 50, such as between 1 and 10. It will be appreciated that the present invention is not limited to any of the examples listed above. In addition, combinations of F—L—Z compounds can be used so as to attach more than one kind of surface active moiety to the particle.

The reaction between the particles and the compound having a surface-active moiety is performed by means standard in the art. If the particles do not have active sites (surface functionality), they are first treated with a small amount of water (i.e. about 1%) to activate the surface by formation of Si—OH groups on surface. The small amount of water used in the treatment will react with the particle and there will be substantially no water left.

The particles having surface functional groups are reacted with the one or more F, F—L or F—L—Z compound ("silylating reagents"), depending on how the reaction is performed, at slightly elevated temperatures (i.e. about 60° C.) in the presence of a catalyst, such as dibutyltindilaurate, for at least about two hours. Typically, between about 0.1 and 5.0 weight percent of catalyst is added, such as 1 percent. Alternatively, the particles and silylating reagent can be admixed with a small amount of water and warmed at elevated temperatures (such as about 120° F.) overnight (such as 14 plus hours). Generally, between about 1 and 100 percent, such as between about 20 and 100 percent, of the surface functional groups on the particle will react with the silylating reagent. For example, an F or F—L containing compound can be reacted first with the particle, with the L—Z or Z containing compound added later. Alternatively, the F—L—Z compound can be reacted directly with the particle; this embodiment is typically more desirable as it provides a more stable particle. The silylating reagent can be added in amounts of 1, 5 or up to about 10 weight percent or even greater, with weight percent being based on the total weight of the particles.

As a result of the reaction described above, the particles have a lower surface tension. The surface tension of the modified particles is lower than the surface tension of the film-forming resin when cured without the particles. As a result, at least some of the particles migrate to the surface of the coating when the coating composition is deposited as a film.

Regardless of whether the particles are unmodified or modified, the particles used in the present invention typically have an average particle size in the nanometer range and/or in the micron range. "Nanoparticles"-particles having an average particle size between about 2.0 to 500 nanometers (nm) such as between about 5.0 to 200.0 nm- can be used. "Microparticles"-particles having an average particle size between about 0.5 to 50 microns such as 0.5 to 10 microns or 0.5 to 5.0 microns-can also be used.

The particle size can be determined by any method known in the art such as by a conventional particle size analyzer. For example, where the average particle size is greater than 1 micron, laser scattering techniques can be employed. For average particle sizes less than 1 micron, Transmission Electron Microscopy ("TEM") can be used.

The amount of particles in the additive can be from in an amount ranging from 2 to 70 weight percent or from 10 to 50 weight percent or from 15 to 40 weight percent, based on the total weight of the additive.

The additive of the present invention can be prepared in the following manner. First, prepare the siloxane compound. The siloxane compound is a 100% solids liquid compound with no solvent. Typically, the siloxane compound is maintained at a temperature between room temperature and 80° C. Then, add the particles to the siloxane compound. Oftentimes, the particles are sold in a solution so the solution containing the particles is added to the siloxane compound. Next, blend and stir the particles and the siloxane compound until a homogeneous mixture is created. Any solvent present in the mixture from the particle solution can be stripped away, such as through application of vacuum or other standard methods, to yield a solventless form. The additive can then be added to a powder coating composition or a liquid coating composition.

The present invention further encompasses coating compositions comprising the additive described above and one or more film-forming resins.

Any film-forming resin can be used to form the coating compositions of the present invention, absent compatibility problems. For example, suitable film-forming resins for powder coating compositions include acrylic, polyester, polyether and polyurethane polymers having hydroxyl functionality. The film-forming resins can also contain other functional groups such as carboxylic acid, carbamate, isocyanate, epoxy, amide and carboxylate functional groups. Examples of suitable film-forming resins are described in U.S. Pat. No. 5,646,228 at column 5, line 1 to column 8, line 7, incorporated herein by reference.

Suitable film-forming resins include acrylic polymers and polyester polymers having carboxylic acid functionality. Monomers for the synthesis of acrylic polymers having carboxylic acid functionality are typically chosen such that the resulting acrylic polymer has a glass transition temperature (Tg) greater than 40° C. Monomers for the synthesis of polyester polymers having carboxylic acid functionality are typically chosen such that the resulting polyester polymer has a Tg greater than 50° C. Examples of suitable carboxylic acid group-containing acrylic polymers are described in U.S. Pat. No. 5,214,101 at column 2, line 59 to column 3, line 23, incorporated herein by reference. Examples of suitable carboxylic acid group-containing polyester polymers are described in U.S. Pat. No. 4,801,680 at column 5, lines 38 to 65, incorporated herein by reference.

Carboxylic acid group-containing acrylic polymers can further contain a second carboxylic acid group-containing material selected from the class of $C_4$ to $C_{20}$ aliphatic dicarboxylic acids, polymeric polyanhydrides, low molecular weight polyesters having an acid equivalent weight from about 150 to about 750, and mixtures thereof.

Suitable film-forming resins also include acrylic, polyester and polyurethane polymers containing carbamate functional groups. Examples of suitable acrylic, polyester and polyurethane polymers containing carbamate functional groups are described in WO Publication No. 94/10213, incorporated herein by reference. Monomers for the synthesis of such polymers are typically chosen so that the resulting polymer has a Tg greater than about 40° C.

Suitable curing agents for powder coating compositions according to the present invention include blocked and unblocked isocyanates, polyepoxides, polyacids, polyols, anhydrides, polyamines, aminoplasts and phenoplasts. One skilled in the art can select the appropriate curing agent depending on the film-forming resin.

Isocyanates, blocked and unblocked, are suitable curing agents for hydroxy and primary and/or secondary amino group-containing materials. Examples of suitable isocyanates are described in U.S. Pat. No. 4,988,793, column 3, lines 1 to 36, incorporated herein by reference.

Polyepoxides are suitable curing agents for COOH functional group-containing materials. Examples of suitable polyacids are described in U.S. Pat. No. 4,681,811 at column 5, lines 33 to 58, incorporated herein by reference.

Polyacids are suitable curing agents for epoxy functional group-containing materials. Examples of suitable polyacids are described in U.S. Pat. No. 4,681,811 at column 6, line 45 to column 9, line 54, incorporated herein by reference.

Polyols, materials having an average of two or more hydroxyl groups per molecule, are suitable curing agents for isocyanate functional group-containing materials and anhydrides. Suitable polyols are well known in the art.

Anhydrides are suitable curing agents for epoxy functional group-containing materials. Examples of suitable anhydrides include, for example, trimellitic anhydride, benzophenone tetracarboxylic dianhydride, pyromellitic dianhydride, tetrahydrophthalic anhydride, and the like. A suitable anhydride curing agent is described in U.S. Pat. No. 5,472,649 at column 4, lines 49–52, incorporated herein by reference.

Aminoplasts are suitable curing agents for hydroxy, carboxylic acid and carbamate functional group-containing materials. Suitable aminoplasts are well known in the art. Examples of suitable aminoplasts curing agents include aldehyde condensates of glycoluril, which give high melting crystalline products useful in powder coatings. While the aldehyde used is typically formaldehyde, other aldehydes such as acetaldehyde, crotonaldehyde, and benzaldehyde can be used.

In powder coating compositions, the film-forming resin can be present in an amount greater than about 50 weight percent or greater than about 60 weight percent or less than 90 weight percent, based on the total weight of the composition. For example, the weight percent of the film-forming resin can be between 60 and 70 weight percent.

Typically, the additive according to the present invention is present in powder coating compositions in an amount ranging from 1 to 35 weight percent or from 2 to 25 weight percent or from 5 to 20 weight percent, based on the total weight of the coating composition.

When a curing agent is used in the present powder coatings, it is generally present in an amount ranging from about 5 and 40 weight percent, based on the total weight of the coating composition.

Powder coating compositions according to the present invention can optionally contain ingredients such as waxes for flow and wetting, flow control agents such as poly(2-ethylhexyl)acrylate, degassing additives such as Benzoin and MicroWax C, adjuvant resins to modify and optimize coating properties, antioxidants, ultraviolet (UV) light absorbers and catalysts. Examples of useful antioxidants and UV light absorbers include those commercially available from Ciba-Geigy under the trademarks IRGANOX and TINUVIN. These optional ingredients, when used, are typically present in amounts of up to 20 percent by weight, based on the total weight of the coating composition.

Suitable film-forming resins for liquid coating compositions include hydroxyl or carboxylic acid-containing acrylic copolymers, hydroxyl or carboxylic acid-containing polyester polymers, and isocyanate or hydroxyl-containing polyurethane polymers, and amine or isocyanate-containing polyureas. These film-forming resins are further described in U.S. Pat. No. 5,939,491 at column 7, line 7 to column 8, line 2. U.S. Pat. No. 5,939,491 as well as the patents referenced therein are hereby incorporated by reference.

Suitable curing agents for the film-forming resins are described in U.S. Pat. No. 5,939,491 at column 6, line 6 to line 62.

Suitable solvents include alcohols, ketones, aromatic hydrocarbons, glycol ethers, esters or mixtures thereof. Typically, the solvent is generally present in amounts ranging from 5 to 80 weight percent or from 30 to 50 percent, based on the total weight of the composition.

In the liquid coating composition, the film-forming resin can be present in an amount ranging from 50 to 95 weight percent, or from 60 to 85 weight percent, or from 70 to 80 weight percent, based on the total non-volatile weight of the coating composition.

Typically, the additive of the present invention is present in the liquid coating in an amount ranging from 1 to 40 weight percent or from 3 to 20 weight percent or from 5 to 8 weight percent, based on the total non-volatile weight of the coating composition.

When a curing agent is used in the present liquid coatings, it is generally present in an amount ranging from about 5 and 60 weight percent, based on the total weight of the coating composition.

The liquid coating compositions of the present invention can contain optional ingredients such as plasticizers, antioxidants, light stabilizers, UV absorbers, thixotropic agents, anti-gassing agents, organic cosolvents, biocides, surfactants, flow control additives and catalysts. The optional ingredients, when used, are typically present in amounts up to 20 weight percent, based on the total weight of the coating composition.

Powder coating compositions according to the present invention can be made using any method known in the art. For example, the film-forming resin, the present additive, and any additional ingredients can be dry blended in a blender, such as a Henschel blade blender. The materials are blended until a homogenous dry blend is formed. The blend is then melt blended in an extruder, such as a twin screw co-rotating extruder at a temperature sufficient to melt but not gel the components. The melted blend is then typically milled to an average particle size of, for example,.from 5 to 70 microns. Other methods known in the art can also be used to form the powder coating composition.

A liquid coating composition according to the present invention can be formed by adding the additive of the present invention at any time during the formulation process. The optimal time may be determined by such parameters as the type of particle, the type of resin and any additives which will be included in the formulation. One skilled in the art can determine how and when to add the present additives based on these parameters.

The loading of the additive according to the present invention in coating compositions can affect not only the level of mar and/or scratch resistance but also the appearance of the cured coating. Thus, the load should be optimized by the user based on the particular application, taking into account, for example, the level of acceptable haze, the level of desired mar and/or scratch resistance, the thickness of the coating and the like. Where appearance is particularly relevant, such as in an automotive clear coat, a relatively low load can be used. One skilled in the art can optimize load to achieve the desired level of mar and/or scratch resistance without compromising the appearance or other mechanical properties of the cured coatings.

The coating composition of the invention can be applied to a variety of substrates. For example, the coating composition can be applied to automotive substrates such as fenders, hoods, doors and bumpers, and industrial substrates such as household appliances, including washer and dryer panels and lids and refrigerator doors and side panels, lighting fixtures, metal office furniture. Such automotive and industrial substrates can be metallic, for example, aluminum and steel substrates, and non-metallic, for example, thermoplastic or thermoset (i.e. "polymeric") substrates. Other objects made from wood and medium density fiberboard can also be coated with the present coating composition.

Generally, the powder coating compositions are applied by spraying, and in the case of a metal substrate, by electrostatic spraying, or by the use of a fluidized bed. The powder coating can be applied in a single sweep or in several passes to provide a film having a thickness after cure ranging from about 1 to 10 mils (25 to 250 micrometers) or about 2 to 4 mils (50 to 100 micrometers). Other standard application methods such as brushing, dipping or flowing can be employed.

Liquid coating compositions according to the present invention can be applied by any conventional method such as brushing, dipping, flow coating, roll coating, conventional and electrostatic spraying. Spray techniques are most often used. Typically, the film thickness of the liquid coatings ranges from between 0.1 and 5 mils, such as between 0.5 and 3.0 mils or 1.5 mils.

Generally, after the coating composition is applied, the coated substrate is baked at a temperature sufficient to cure the coating. Powder coatings applied on metallic substrates are typically baked at a temperature ranging from 250° F. to 500° F. (121.1° C. to 260.0° C.) for 1 to 60 minutes, or from 300° F. to 400° F. (148.9° C. to 204.4° C.) for 15 to 30 minutes. During bake, some of the particles can migrate to the top quarter of the coating layer.

Liquid coating compositions such as those using a polyisocyanate or polyanhydride curing agent can be cured at ambient temperature or they can be thermally cured. During cure, some of the particles can migrate to the top quarter of the coating layer.

Liquid coating compositions that are cured at ambient temperature are usually prepared as a two (2) package system in which the curing agent is kept separate from the composition containing the reactive functional group(s). The packages are combined shortly before application.

Thermally curable liquid compositions such as those using blocked isocyanate, aminoplast, phenoplast, polyepoxide or polyacid curing agents can be prepared as a one-package system. These compositions are typically cured at elevated temperatures for 1 to 30 minutes at a temperature between 250° F. and about 450° F. (121° C. to 232° C.); the curing temperature is primarily determined by the type of substrate used. The dwell time (i.e., time that the coated substrate is exposed to elevated temperature for curing) is dependent upon the cure temperature and the wet film thickness of the applied coating composition. For example, coated automotive elastomeric parts require a long dwell time at a lower temperature (e.g., 30 minutes 250° F. (121° C)). Coated aluminum beverage containers require a very short dwell time at a very high cure temperature (e.g., 1 minute 375° F. (191° C)).

Coating compositions according to the present invention are particularly useful as primers and as color and/or clear coats in color-plus-clear coatings. Pigmented coatings according to the present invention can be applied directly to a substrate to form a color coat. The color coat can be a primer for subsequent application of a topcoat or a colored topcoat. Alternatively, the coating composition can be an unpigmented clearcoat for application over a color coat either as a primer coat or a colored topcoat. When used as a primer coating, the thickness of the coating is typically about 0.4 to 4.0 mils. When used as a color topcoat, the thickness of the coating is typically about 0.5 to 4.0 mils. When used as a clearcoat, the thicknesses of the coating is typically about 1.5 to 4.0 mils.

The present invention is also directed to a substrate coated with one or more of the coating compositions described herein. The substrates and compositions, and manner of applying the same, are as described above.

The present invention is further directed to a multi-layer composite coating composition comprising a basecoat formed from a basecoat film-forming composition and a topcoat deposited over at least a portion of the basecoat, where the topcoat is comprises a coating composition according to the present invention. The basecoat can have a cured film thickness between about 0.5 and 4 mils (12.5 and 100 micrometers), and the topcoat can have a cured film thickness up to 10 mils (250 micrometers). The basecoat can be cured before the topcoat is applied, or the two coats can be cured together. For example, the basecoat can be formed from a pigmented film-forming composition, and a transparent topcoat can be formed from a coating composition according to the present invention. This is the color-plus-clear system discussed above, frequently used in automotive applications.

In another embodiment, the present invention is directed to a method for improving the mar and/or scratch resistance of a coated substrate comprising applying the coating composition of the present invention to at least a portion of the substrate and then curing the coating. Application can be by any means known in the art to the thicknesses described above.

The coating compositions of the present invention have outstanding appearance properties and scratch and mar resistance properties as compared to no additive being present.

EXAMPLES

The following examples are intended to illustrate the present invention and should not be construed as limiting the invention in any way.

Various additives (Dispersed Particles A–D) according to the present invention were prepared by dispersing different types of particles in different types of siloxane compounds. The preparation of Dispersed Particles A–D is discussed below:

A carbinol functional siloxane ("Intermediate A"), a carboxylic acid functional siloxane ("Intermediate B"), and Intermediate C were used to prepare Dispersed Particles A–D. Intermediate A was prepared as follows: first, a glass reaction vessel was equipped with an addition funnel, a mechanical agitator and a nitrogen blanket. Second, 476 parts by weight of 1,2-propylene glycol monoallyl ether was added to the reaction vessel and heated to 75° C. Third, 870 parts by weight of 1,1,1,3,5,5,5-heptamethyltrisiloxane was charged to the addition funnel, and 5% of the material in the addition funnel was added to the reaction vessel. Fourth, 0.5 parts by weight of a catalyst solution- 7.5% by weight chloroplatinic acid in isopropanol- was added to the reaction vessel. Fifth, the remaining contents of the addition funnel were added to the reaction vessel over a period of 1 hour and 15 minutes during which time the temperature of the reaction vessel was maintained between 95–105 ° C. Sixth, the reaction vessel was held at 95° C. for 1 hour. Seventh, the contents of the reaction vessel were filtrated to yield a carbinol functional siloxane with a hydroxyl number of 162 mg KOH/gram of product.

Intermediate B was prepared as follows: first, a glass reaction vessel was equipped with an addition funnel, a mechanical agitator and a nitrogen blanket. Second, 150 parts by weight of 1,2-cyclohexanedicarboxylic anhydride was added to the reaction vessel and heated to 125° C. Second, 355 parts by weight of Intermediate A was charged to the addition funnel, and the contents of the addition funnel were added to the reactor over a period of 45 minutes during which time the temperature of the reaction vessel was maintained between 125-130° C. Third, the reaction vessel was held at 125° C. until the acid value of the material in the reaction vessel was approximately equal to theoretical acid value. Fourth, the contents of the reaction vessel were filtrated to yield a carboxylic acid functional siloxane with an acid value of 106 mg KOH/gram of product.

Intermediate C was prepared as follows: first, a glass reaction vessel was equipped with a mechanical agitator. Second, 300 parts by weight of MIBK-ST (30% colloidal silica in methyl isobutyl ketone) which is commercially available from Nissan, 4.5 parts by weight of 10,10,10,9,9,8,8,7,7,6,6,5,5,4,4,3,3-heptadecafluorodecyltrimethoxysilane and 1 part by weight of dibutyltin dilaurate (catalyst) were charged to the reaction vessel and mixed for 2 hours at 60° C.

Dispersed Particle A was prepared in the following manner: in a glass reaction vessel equipped with a mechanical agitator and a nitrogen blanket, 180 parts by weight of Intermediate B was heated to 50° C. Then 400 parts by weight of Highlink OG 502-31 (30% colloidal silica in isopropanol) which is commercially available from Clariant was charged to the reaction vessel and thoroughly mixed. Lastly, volatile solvents were removed by vacuum distillation at 50–65° C. to yield a viscous liquid containing approximately 40% by weight colloidal silica.

Dispersed Particle B was prepared in the following manner: in a glass reaction vessel equipped with a mechanical agitator and a nitrogen blanket, 150 parts by weight of Intermediate A was heated to 50° C. Then 500 parts by weight of Highlink OG 502-31 (30% colloidal silica in isopropanol) was charged to the reaction vessel and thoroughly mixed. Lastly, volatile solvents were removed by vacuum distillation at 50–65° C. to yield a viscous liquid containing approximately 50% by weight colloidal silica.

Dispersed Particle C was prepared in the following manner: in a glass reaction vessel equipped with a mechanical agitator and a nitrogen blanket, 171 parts by weight of Intermediate B was heated to 50° C. Then 380 parts by weight of MIBK-ST (30% colloidal silica in methyl isobutyl ketone) which is commercially available from Nissan was charged to the reaction vessel and thoroughly mixed. Lastly, volatile solvents were removed by vacuum distillation at 50–65° C. to yield a viscous liquid containing approximately 40% by weight colloidal silica.

Dispersed Particle D was prepared in the following manner: in a glass reaction vessel equipped with a mechanical agitator and a nitrogen blanket, 180 parts by weight of Intermediate B was heated to 50° C. Then 400 parts by weight of Intermediate C was charged to the reaction vessel and thoroughly mixed. Lastly, volatile solvents were removed by vacuum distillation at 50–65° C. to yield a viscous liquid containing approximately 40% by weight colloidal silica.

Various experimental coating compositions (Examples 1–13) were prepared containing Dispersed Particles A–D. Table 1 shows formulation data for the various exemplary compositions.

Examples 1–13 were prepared in the following manner. First, the components specified in Table 1 were blended in a Henschel Blender for between 60 to 90 seconds. Second, the mixtures were extruded through a Werner & Pfleider co-rotating, twin screw extruder at a screw speed of 450 RPM; the extrudate temperature was between 100° C. and 125° C. Lastly, the extruded material was ground to a particle size ranging from 17 to 20 microns using an ACM Grinder which is commercially available from Micron Powder Systems.

To evaluate the performance of the exemplary coating compositions, coated panels were made in the following manner. Black Electrocoat Primer ED505 commercially available from PPG Industries, Inc. was applied to cold rolled steel test panels from ACT Laboratories and fully cured. The exemplary coating compositions were then electrostatically sprayed on the test panels.

The coated panels were subjected to the following tests: the 3M Abrasive Paper Scratch Resistance Test; the BON AMI Mar Resistance Test ("BON AMI"); and a steel wool scratch test. Table 2 shows the results of the various tests.

Initial haze and all gloss measurements such as initial 20° gloss ("20°") and the gloss retention (initial 20° gloss–20° gloss after the test×100) were measured using a BYK/Haze Gloss meter available from Gardner Instrument Company, Inc.

The 3M Abrasive Paper Scratch Resistance Test was administered in the following manner. A 2"+2" piece of the particular 3M Abrasive Paper, either $2\mu$, $3\mu$, and $9\mu$, backed with felt cloth was clamped to the acrylic finger on the arm of the BYK/Haze Gloss meter. Next, the test panel received a set of 10 double rubs with the abrasive paper. The panel was then rinsed with cool tap water and dried. The 20° and the gloss retention were measured.

The BON AMI Mar Resistance Test ("BON AMI") was administered as follows. First, the 20° of the coated panel was measured. Then, the coated panel was lightly dusted with BON-AMI abrasive cleanser from the Bon-Ami Company. Next, the dusted panel was run through 30 cycles on an Atlas AATCC Mar Tester Model CM-5 from Atlas Electrical Devices Co. The Atlas AATCC Mar Tester was operated with a felt cloth cover on its cylindrical acrylic finger. The felt cloth covering was replaced every 10 cycles. After 30 cycles of mar testing, the test panel was rinsed with cold tap water, dried, and the 20° was measured. The percent gloss retained was calculated using the following equation: (20° measurement after BON AMI mar testing/initial 20° gloss measurement) multiplied by 100.

The steel wool scratch test was administered in the following manner. The test panel received ten double rubs of a 1381 g hammer wrapped with 0000# grade steel wool. The 20° and gloss retention were then measured.

TABLE 1

Formulation Data

| Component [g] | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Acrylic Resin][1] | 526.0 | 526.0 | 526.0 | 526.0 | 526.0 | 526.0 | 526.0 | 526.0 | 526.0 | 526.0 |
| DDDA[2] | 115.5 | 115.5 | 115.5 | 115.5 | 115.5 | 115.5 | 115.5 | 115.5 | 115.5 | 115.5 |

TABLE 1-continued

Formulation Data

| Component [g] | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Microwax C[3] | 3.5 | 3.5 | 3.5 | 3.5 | 3.5 | 3.5 | 3.5 | 3.5 | 3.5 | 3.5 |
| Benzoin[4] | 2.5 | 2.5 | 2.5 | 2.5 | 2.5 | 2.5 | 2.5 | 2.5 | 2.5 | 2.5 |
| Modaflow[5] | 6.0 | 6.0 | 6.0 | 6.0 | 6.0 | 6.0 | 6.0 | 6.0 | 6.0 | 6.0 |
| TPTH[6] | 6.0 | 6.0 | 6.0 | 6.0 | 6.0 | 6.0 | 6.0 | 6.0 | 6.0 | 6.0 |
| Dispersed Particle A | | | 54.0 | 54.0 | | | | | | |
| Goresil 25[7] | | 40.0 | 40.0 | | | | | 40.0 | 40.0 | 40.0 |
| Dispersed Particle B | | | | | 54.0 | | | 54.0 | | |
| Dispersed Particle C | | | | | | 54.0 | | | 54.0 | |
| Dispersed Particle D | | | | | | | 54.0 | | | 54.0 |

[1]ALMATEX PD-9060 which is commercially available from Anderson Development Co.
[2]Dodecanedioic acid
[3]ethylene bis-stearoylamide, a fatty acid amide, which is commercially available from Hoechst.
[4]A balsamic resin obtained from Styrax Benzoin.
[5]A non-silicone acrylic flow and leveling agent which is commercially available from Solutia Inc.
[6]triphenyltin hydroxide.
[7]A high purity, heat processed silica with an average particle size of 2u which is commercially available from C.E.D. PROCESSED MINERALS INC.

TABLE 2

Performance Results for the Exemplary Compositions

| | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Initial 20° | 82.0 | 77.2 | 76.8 | 82.2 | 82.0 | 82.0 | 82.0 | 77.0 | 77.0 | 75.0 |
| Initial Haze | 29.3 | 83.9 | 87.1 | 31.4 | 29.0 | 29.0 | 32.0 | 82.0 | 84.0 | 90.0 |
| 9u Scratch-20° | 18.2 | 25.1 | 42.9 | 41.1 | 24.9 | 26.5 | 36.1 | 34.5 | 27.8 | 36.9 |
| 9u Scratch-Gloss Retention | 22.2 | 32.5 | 55.9 | 50.0 | 30.4 | 32.3 | 44.0 | 44.8 | 36.1 | 49.2 |
| 3u Scratch-20° | 30.9 | 40.8 | 57.5 | 63.2 | 36.2 | 31.6 | 40.4 | 46.6 | 41.7 | 56.0 |
| 3u Scratch-Gloss Retention | 37.7 | 52.8 | 74.9 | 76.9 | 44.1 | 38.5 | 49.3 | 60.5 | 54.1 | 74.7 |
| 2u Scratch-20° | 63.2 | | | 78.4 | 69.3 | 65.7 | 72.6 | 73.1 | 66.6 | 73.2 |
| 2u Scratch-Gloss Retention | 77.1 | | | 95.4 | 84.5 | 80.1 | 88.5 | 94.9 | 86.5 | 97.6 |
| 20x Bonami-20° | 58.7 | 69.6 | 71.7 | 66.3 | 67.2 | 76.0 | 76.7 | 76.0 | 76.7 | 75.5 |
| 20x Bonami-Gloss Retention | 71.6 | 90.2 | 93.4 | 80.7 | 82.0 | 92.7 | 93.5 | 98.7 | 99.6 | 100.7 |
| Steel Wool-20° | 63.0 | 77.2 | 73.7 | 67.6 | 71.1 | 71.2 | 72.3 | 77.0 | 76.4 | 75.7 |
| 5x Steel Wool-Gloss Retention | 76.8 | 100.0 | 96.0 | 82.2 | 86.7 | 86.8 | 88.2 | 100.0 | 99.2 | 101.0 |

CONCLUSIONS

As can be seen from the performance results above, coating compositions that contain the additive of the present invention demonstrated improved mar and scratch performance. Coating compositions that contained the additive of the present invention and Goresil demonstrated improved scratch resistance over compositions that contained only the additive of the present invention or only Goresil.

We claim:
1. An additive comprising:
   a. at least one siloxane compound comprising the structure (I):

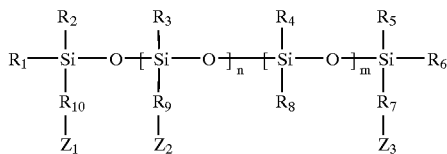

wherein
   $R_1$, $R_2$, $R_3$, $R_4$, $R_5$, $R_6$, and $R_8$, which can be the same or different, are monovalent hydrocarbon groups of 1 to 10 carbon atoms,
   $R_7$, $R_9$, and $R_{10}$, which can be the same or different, are divalent hydrocarbon groups of 1 to 24 carbon atoms, and
   at least $Z_1$, $Z_2$, or $Z_3$ comprises a hydrogen active group,
   n is 0 to 12, and
   m is 0 to 12; and
   b. particles dispersed in said siloxane compound;
wherein said siloxane compound is present in the additive in an amount ranging from 30 to 98 weight percent, based on the total weight of the additive.

2. An additive according to claim 1 wherein said siloxane compound is selected from the group comprising 1,1,1,3,3,5,5 heptamethyl-5-(hydroxyethoxypropyl)trisiloxane, 1,1,3,3-tetramethyl-1,3-di(hydroxyethoxypropyl)trisiloxane, and [3-[1,3,3,3-tetramethyl-1-[(trimethylsilyl)oxy]disiloxanyl]propoxy]-propanol.

3. An additive according to claim 1 wherein said siloxane compound comprises the reaction product of a silicone surfactant and hexahydrophthalic anhydride.

4. An additive according to claim 1 wherein said siloxane compound comprises carboxylic acid functionality.

5. An additive according to claim 1 wherein said particles are selected from the group comprising silica, alumina, borosilicate glass, oxides, quartz, and zircon.

6. An additive according to claim 5 wherein said particles are silica.

7. An additive according to claim 1 wherein said particles are present in the additive in an amount ranging from 2 to 70 weight percent, based on the total weight of the additive.

8. An additive according to claim 1 wherein said particles have an average particle size ranging from 2.0 to 500.0 nanometers.

9. An additive according to claim 1 wherein said particles have an average particle size ranging from 0.5 to 50.0 microns.

10. An additive according to claim 1 wherein said particles are reacted with a compound having a surface-active moiety before being dispersed in said siloxane compound.

11. A coating composition comprising
    a. a film-forming resin; and
    b. the additive of claim 1.

12. A coating composition according to claim 11 wherein said film-forming resin is selected from the group comprising acrylic, polyester, polyether and polyurethane polymers having hydroxyl functionality.

13. A coating composition according to claim 12 wherein said film-forming resin comprises an acrylic polymer.

14. A coating composition according to claim 11 wherein said film-forming resin comprises at least one reactive functional group.

15. A coating composition according to claim 14 wherein the reactive functional group is selected from the group comprising hydroxyl groups, a carbamate groups, epoxy groups, isocyanate groups, and carboxyl groups.

16. A coating composition according to claim 12 wherein said film-forming resin is present in the coating composition in an amount ranging from 40 to 90 weight percent, based on the total weight of the coating composition.

17. A coating composition according to claim 11 wherein the siloxane compound comprises the reaction product of a silicone surfactant and hexahydrophthalic anhydride.

18. A coating composition according to claim 11 wherein the siloxane compound is present in the coating composition in an amount ranging from 5.0 to 20.0 weight percent and the particles are present in the coating composition in an amount ranging from 1.5 to 10.0 weight percent, based on the total weight of the coating composition.

19. A coating composition according to claim 11 wherein the particles are selected from the group comprising silica, alumina, borosilicate glass, oxides, quartz, and zircon.

20. A coating composition according to claim 11 wherein the particles have an average particle size ranging from 2.0 to 500.0 nanometers.

21. A coating composition according to claim 11 wherein the particles are reacted with a compound having a surface-active moiety before being dispersed in the siloxane compound.

22. A coating composition according to claim 11, further comprising a curing agent.

23. A coated substrate comprising a cured coating composition according to claim 11.

24. A coated substrate according to claim 23 wherein the cured coating composition is a colored topcoat.

25. A coated substrate according to claim 23 wherein the cured composition is a transparent topcoat applied over at least a portion of a basecoat.

26. A coated substrate according to claim 23 wherein the substrate is an automotive bumper.

27. A multi-layer composite coating comprising a basecoat formed from a basecoat film-forming composition and a transparent topcoat formed from a topcoat film-forming composition deposited over the basecoat the topcoat film-forming composition comprising:
    a. a film-forming resin; and
    b. the additive of claim 1.

28. A method for improving the mar and scratch resistance of a coated substrate comprising the steps of:
    a. applying to at least a portion of the substrate a coating composition comprising a film-forming resin and the additive of claim 1; and
    b. curing the applied coating composition.

* * * * *